Aug. 12, 1958   D. F. RETTIG   2,846,803
FISH HOOK BAITER
Filed April 24, 1956

INVENTOR.
DAVID F. RETTIG
BY
*Christie, Parker & Hale*
ATTORNEYS.

United States Patent Office 2,846,803
Patented Aug. 12, 1958

2,846,803

FISH HOOK BAITER

David F. Rettig, Redlands, Calif.

Application April 24, 1956, Serial No. 580,243

1 Claim. (Cl. 43—4)

This invention relates to devices and methods for use in baiting a fish hook with soft bait.

Many fishermen use a soft bait such as cheese or a specifically prepared composition. Such bait is difficult to use because it is hard to form it by hand in just the right quantity to hide the hooked end of a fish hook and because the bait tends to fall off the fish hook when it is placed in water. Also, specially prepared baits frequently have an undesirable odor which gets on the fisherman's hands when he baits his hook by hand in the conventional manner. In addition, natural oils from the skin, and gasoline and oil from outboard motors distract fish, so that it is desirable to avoid touching the bait.

These difficulties are overcome in accordance with the present invention by inserting the bait into a hollow member so as to form it into the desired shape, inserting the hooked end of the fish hook into the bait while it is still in the forming member, and then ejecting the bait from the forming member with the fish hook imbedded in it.

The forming member is preferably a hand operated baiter which may be carried in the fisherman's pocket or tackle box. It is desirable to employ a baiter which corresponds to the size of the fish hook which is to be baited. Hence, baiters of various sizes may be employed for baiting fish hooks of different sizes.

The invention is explained in detail with reference to the drawings, in which.

Figure 1:
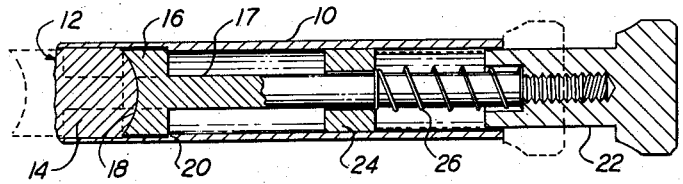
Fig. 1 is a sectional view of a preferred form of the fish hook baiter.

The device for baiting a fish hook comprises a hollow cylindrical member 10 having an open end 12 which serves to receive and shape a portion 14 of soft bait. The hollow cylindrical member should have an inner diameter which is slightly larger than the transverse dimension of the hooked end of the fish hook which is to be baited. As shown in the drawing, the open end of the cylindrical member is provided with a beveled edge so that it can be more easily pressed into the bait material.

A plunger 16 having a shaft 17 is located inside the cylindrical member adjacent its open end, and it is provided with a convace face 18 which faces the open end of the cylindrical member. The concave face shapes the bait to the curvature of the hook, so that a minimum of bait material is required to cover the hook.

A stop in the form of a shoulder 20 in the cylindrical member is provided for engaging the plunger so as to limit its movement in the direction away from the open end of the cylindrical member. The shoulder 20 should be located so as to stop the plunger at a distance from the open end of the cylindrical member which is slightly larger than the longitudinal dimension of the hooked end of the fish hook, which is to be baited, so that the entire hooked end of the fish hook may be inserted into the shaped bait.

An end member 22 is connected to the shaft of the plunger, and it extends outside the end of the cylindrical member so that a fisherman may hold the cylindrical member in one hand and operate the plunger by pushing on the end member 22 with a thumb or finger of the same hand.

A guide member 24 is located inside the cylindrical member for guiding the movement of the shaft of the plunger. The guide member 24 may be secured to the cylindrical member by a press fit. A spring 26 is disposed between the guide 24 and the end member 22, and it tends to urge the plunger into the cylindrical member and against the stop 20.

The baiter may be made out of various types of material. I prefer a material of light weight which will not rust, such as an alloy of aluminum, for all of the parts except the spring 26 which may be a conventional type.

Figure 2:
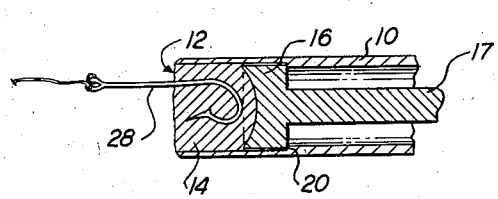
Fig. 2 is a fragmentary sectional view showing how a fish hook is inserted into the bait.
Figure 3:
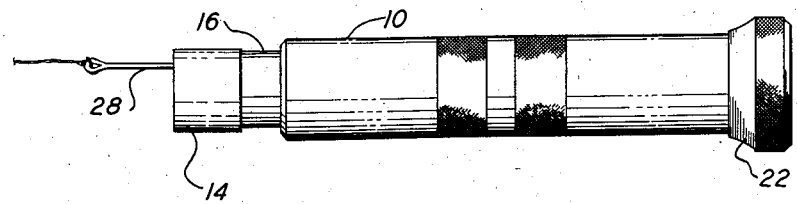
Fig. 3 is a plan view of the device showing how the baited fish hook is ejected from the end of the fish baiter.

In order to use the fish baiter, its open end 12 is inserted into the bait which may be cheese, prepared bait, or the like. The end of the fish baiter is filled with bait, and then it may be pressed against a hard object such as the lid of the container for the bait so as to compress the bait firmly. Then the fish hook is inserted into the formed bait. Fig. 2 illustrates how a fish hook 28 may be inserted into the formed bait, with the fish hook being completely hidden by the bait.

The end member 22 is then actuated by the fisherman so as to cause the plunger 16 to eject the bait and the hook from the cylindrical member.

Thus, the fish hook baiter packs the bait firmly on the hook in just the right amount so as to hide the hook completely. The fisherman does not need to touch the bait, and hence his hands do not become contaminated by the fish bait and the fisherman's hands do not contaminate the bait.

I claim:

Apparatus for use in baiting a fish hook with soft bait without touching the bait, comprising a hollow cylindrical member having an interior portion thereof at one end of larger inside diameter than the inside diameter of the remainder of the cylindrical member, the enlarged diameter end being slightly larger than the transverse dimension of the hooked end of the fish hook which is to be baited for receiving said hooked end, said portion having a thin wall for slicing into the bait material, a plunger having a spherically concave end face and slidably positioned in said portion, the plunger being larger in diameter than the inside diameter of the remainder of the cylindrical member, whereby the plunger engages the end of the smaller diameter portion of the cylindrical member as a stop, a push shaft secured to the plunger and extending out through the small inside diameter end of the cylindrical member so that a fisherman may hold the cylindrical member in one hand and operate the plunger by pushing on the shaft with a thumb or finger of the same hand, and a spring coupled between the cylindrical member and the shaft for urging the plunger against the stop, the larger inside diameter region of the cylindrical member extending beyond the end face of the plunger a distance slightly larger than the logitudinal dimension of the hooked end of the fish hook which is to be baited when said plunger is against said stop, the spherically concave end face of the plunger conforming the bait to the curvature of the hook, whereby a compact plug of bait may be formed on a hook to completely cover and conceal the hooked end of a hook with a minimum of bait material and said baited hooked end may be ejected from said large diameter end by said plunger.

References Cited in the file of this patent

UNITED STATES PATENTS

| | | |
|---|---|---|
| 1,509,302 | Larssen | Sept. 23, 1924 |
| 1,552,889 | Soss | Sept. 8, 1925 |
| 2,458,671 | Zirbel | Jan. 11, 1949 |
| 2,549,559 | Allison | Apr. 17, 1951 |

FOREIGN PATENTS

| | | |
|---|---|---|
| 438,213 | Italy | July 27, 1948 |